United States Patent [19]

Kmiecik-Lawrynowicz et al.

[11] Patent Number: 5,744,520
[45] Date of Patent: Apr. 28, 1998

[54] AGGREGATION PROCESSES

[75] Inventors: Grazyna E. Kmiecik-Lawrynowicz, Burlington; Richard P. N. Veregin, Mississauga; Raj D. Patel, Oakville; Michael A. Hopper, Toronto; Maria V. McDougall, Burlington, all of Canada

[73] Assignee: Xerox Corporation, Stamford, Conn.

[21] Appl. No.: 684,955

[22] Filed: Jul. 19, 1996

Related U.S. Application Data

[62] Division of Ser. No. 497,737, Jul. 3, 1995, Pat. No. 5,565,296.

[51] Int. Cl.$^6$ .............. C08K 9/08; C08K 3/22; C08K 5/41; C08L 1/26
[52] U.S. Cl. .......... 523/334; 523/205; 523/215; 523/335; 523/223; 524/44; 524/45; 524/46; 524/156; 524/406; 524/408; 524/413; 524/430; 524/431; 524/432; 524/503; 430/137
[58] Field of Search .............. 430/137; 523/332, 523/334, 335, 339, 205, 206, 215, 223; 524/44, 45, 46, 156, 430, 431, 432, 406, 408, 413, 503

[56] References Cited

U.S. PATENT DOCUMENTS

| | | |
|---|---|---|
| 4,797,339 | 1/1989 | Maruyama et al. .............. 430/109 |
| 4,800,103 | 1/1989 | Jeffs .............................. 523/205 |
| 4,983,488 | 1/1991 | Tan et al. ....................... 430/137 |
| 4,996,127 | 2/1991 | Hasegawa et al. ............. 430/109 |
| 5,344,738 | 9/1994 | Kmiecik-Lawrynowicz et al. .. 523/335 |
| 5,364,729 | 11/1994 | Kmiecik-Lawrynowicz et al. .. 430/137 |
| 5,366,841 | 11/1994 | Patel et al. .................... 523/335 |
| 5,403,693 | 4/1995 | Patel et al. .................... 523/335 |
| 5,565,296 | 10/1996 | Kmiecik-Lawrynowicz et al. .. 430/137 |
| 5,650,255 | 7/1997 | Ng et al. ....................... 523/334 |

*Primary Examiner*—Peter A. Szekely
*Attorney, Agent, or Firm*—E. O. Palazzo

[57] ABSTRACT

A process for the preparation of polymer compositions which comprises mixing a conductive component with an anionic polymeric latex containing a polymer; adding a cationic surfactant, or flocculant whereby the aggregation of the latex particles and the conductive component particles results; subsequently adding colloidal stabilizer, followed by the addition of a base to obtain a pH of from about 7 to about 12; heating above about the polymer glass transition temperature thereby enabling the severage, or breakage of the formed aggregated particles; further heating above about the polymer glass transition temperature enabling the coalescence of the polymer and conductive component particles; and optionally washing and drying the resulting coalesced product.

25 Claims, No Drawings

1
AGGREGATION PROCESSES

This is a division of application Ser. No. 497,737, filed Jul. 3, 1995, now U.S. Pat. No. 5,565,296.

BACKGROUND OF THE INVENTION

The present invention is generally directed to processes, and more specifically, to aggregation and coalescence processes for the preparation of polymer carrier coatings, especially conductive polymeric coatings. Carriers coated with the polymers obtained can be selected for known electrophotographic imaging, printing processes, including color processes, and lithography. In embodiments, the present invention is directed to a process for the preparation of conductive carrier coatings by aggregating submicron, about 50 to 200 nanometers, polymeric latex particles with a conductive component like carbon black by the addition of a cationic flocculant to form aggregates of an effective size, for example about 5 to about 10 microns in average volume diameter, and wherein the aggregates are held together primarily by electrostatic forces, and thereafter adding a known base component and heating for the primary purpose of reducing the aggregates to a size of from about 0.5 to about 1 micron in average volume diameter, and subsequently, coalescing at a temperature of from about above or at the resin or polymer glass transition temperature, Tg; and optionally washing and drying the conductive polymer obtained. The polymers obtained can be selected as carrier coatings for use in xerographic imaging and printing methods, including digital processes. The carrier particles can be prepared by a number of methods, such as blending and heating the conductive polymer particles obtained with a carrier core like iron, iron powder, steel, ferrites, and the like. The processes of the present invention in embodiments can be considered emulsion/aggregation processes, semi-reverse aggregation by the addition of a basic component.

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. This process is thus directed to the use of coagulants, such as inorganic magnesium sulfate, which results in the formation of particles with a wide GSD. In U.S. Pat. No. 4,797,339, there is disclosed a process for the preparation of toners by resin emulsion polymerization, wherein similar to the '127 patent certain polar resins are selected.

Emulsion/aggregation processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,346,797, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797.

SUMMARY OF THE INVENTION

It is an object of the present invention to provide carrier coatings and carrier coating processes with many of the advantages illustrated herein, including permitting narrower particle size distributions than obtainable with, for example, suspension polymerization, thereby eliminating coating problems because of non-uniform particle size. Also, with the present invention water based dispersions can be utilized, thus solvents can be eliminated from the known coating processes rendering it environmentally acceptable. Moreover, with the present invention numerous different monomers can be selected thereby enabling the preparation of positively charged or negatively charged carrier coatings. Emulsion polymerization of the present invention permits the synthesis of polymers with high weight average molecular weight ($M_w$) in the range of from about 50,000 to about 1,000,000, and high Tg in the range of 70° to 100° C., and also the process conversion to polymer is high, for example 99 to 99.9 percent, thus the process of the present invention enables very robust carrier coatings.

In another object of the present invention there are provided simple and economical processes for the direct preparation of conductive polymers.

In another object of the present invention there are provided simple and economical in situ chemical processes for polymers with conductive components like carbon black dispersed therein.

In a further object of the present invention there is provided a process for the preparation of conductive polymer components with an average volume diameter of from about 0.5 to about 1 micron as measured by a Coulter Counter, a Disc Centrifuge, Scan Electron Microscopy or Transmission Electron Microscopy.

In a further object of the present invention there is provided a process for the preparation of coatings for carriers with certain effective particle sizes by controlling the size of the latex, temperature and pH of the process.

In another object of the present invention there is provided a composite conductive polymeric resin in high yields of from about 95 percent to about 100 percent by weight.

These and other objects of the present invention are accomplished in embodiments by the provision of polymers, conductive polymers, carriers, and processes thereof. In embodiments of the present invention, there are provided processes for the economical direct preparation of conductive polymers with, for example, a size diameter (average volume diameter) of from about 0.5 to about 1 micron, and more specifically, the process of the present invention comprises the synthesis, or provision of a submicron anionic polymer latex comprised, for example, of polymethacrylate or copolymer of polystyrene and polyacrylic acid in which the ratio by weight, for example, of polyacrylic acid to polystyrene can vary, for example, from about 0/100 to about 50/50, and which latex is preferably prepared by batch emulsion polymerization; dispersing a conductive component, such as carbon black, preferably submicron in size in the polymer latex, or in cationic surfactant, in the concentration from about 5 percent to about 25 percent; adding a surfactant, or flocculant with high shear whereby the aggregation of the latex particles and the conductive particles results, and which aggregates are of a micron size, for example from about 5 to about 10 microns; adding a colloidal stabilizer, such as for example anionic surfactant, while stirring; adding a known base like sodium hydroxide to obtain a pH of over 7, and more specifically, from about 8 to 12, and preferably 9; heating the formed aggregates of a size, for example, of from about 5 to about 10 microns above the resin, or polymer Tg, which heating causes the severage, and/or breakage of the aggregates to smaller size aggregates, for example to aggregates of from about 0.5 to about 1 micron; further heating for an effective time, such as about 4 hours above about the polymer Tg to coalesce the polymer and conductive particles; followed by optional washing and drying. There results a conductive polymer, and more specifically, a polymer with a conductive carbon black dispersed therein, and which conductive polymer can be selected as a carrier coating. High shearing of about 4,000 rpm to about 10,000 rpm can be accomplished by, for example, utilizing a high shearing device, such as a DS-41 continuous stirring device (Janke & Kunkel IKA Labortechnik) or Brinkmann Polytron, at, for example, 4,000 to 10,000 rpm, or sonicator or microfluidizer. The aggregation can be achieved by stirring using a mechanical stirrer at, for example, 250 to 500 rpm, while heating at a temperature below the polymer Tg, such as at a temperature of from about 50° to about 80° C. (or 5° to 20° C. below the polymer Tg). The breakage of big aggregates of, for example, 5 to 10 microns formed provide smaller size aggregates of, for example, 0.5 to 1 micron, which is achieved by the addition of colloidal stabilizer, for example an anionic surfactant followed by the addition of the base, for example 1M of sodium hydroxide solution to obtain a pH of, for example, 6.5 to 12, and heating above or at the polymer, or resin Tg, for example from about 5° to about 50° C. above the resin Tg, for the period of time from between 0.5 hour to about 4 hours to cause coalescence, and followed by washing with, for example, water to remove, for example, surfactant, and drying such as by use of an Aeromatic fluid bed dryer, freeze dryer, or spray dryer. Heating above the Tg can include heating at about the Tg or slightly below the Tg, in embodiments. Embodiments of the present invention include a process for the preparation of polymer compositions which comprises mixing a conductive component with an anionic polymeric latex containing a polymer; adding a cationic surfactant, or flocculant whereby the aggregation of the latex particles and the conductive component particles results; subsequently adding colloidal stabilizer, followed by the addition of a base to obtain a pH of from about 7 to about 12; heating above about the polymer glass transition temperature thereby enabling the severage, or breakage of the formed aggregated particles; further heating above about the polymer glass transition temperature enabling the coalescence of the polymer and conductive component particles; and washing and drying the resulting coalesced product. The aforementioned polymer product can be selected as a carrier coating, and wherein the polymer is mixed with known carrier cores, and wherein the polymer weight is, for example, from about 0.1 to about 3 weight percent in embodiments.

Methods for obtaining the conductive pigment, or component dispersion depends, for example, on the form of the pigment utilized. In some instances, pigments available in the wet cake form or concentrated form containing water can be easily dispersed utilizing a homogenizer or stirring. In other instances, pigments are available in a dry form, whereby dispersion in water is preferably effected by microfluidizing using, for example, a M-110 microfluidizer and passing the pigment dispersion from 1 to 10 times through the chamber of the microfluidizer, or by sonication, such as using a Branson 700 sonicator, with the optional addition of dispersing agents such as the aforementioned ionic or nonionic surfactants.

Illustrative examples of polymers or resins which can be prepared from the monomers present in the latex selected for the processes of the present invention include known polymers such as poly(methacrylic acid), poly(styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(metamethyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); polymers such as poly(styrene-butadiene-acrylic acid), poly(styrene-butadiene-methacrylic acid), PLIOTONE™ available from Goodyear, polyethylene-terephthalate, polypropylene-terephthalate, polybutylene-terephthalate, polypentylene-terephthalate, polyhexalene-terephthalate, polyheptadene-terephthalate, polyoctalene-terephthalate, POLYLITE™ (Reichhold Chemical Inc), PLASTHALL™ (Rohm & Hass), CYGAL™ (American Cyanamide), ARMCO™ (Armco Composites), CELANEX™ (Celanese Eng), RYNITE™ (DuPont), STYPOL™, and the like. The resin selected for the carrier coating, which generally can be in embodiments styrene acrylates, styrene butadienes, styrene methacrylates, or polyesters, can be of small average particle size, such as from about 0.01 micron to about 1 micron in average volume diameter as measured by the Brookhaven nanosize particle analyzer-or a disc centrifuge. Other sizes and effective amounts of resin particles may be selected in embodiments, for example copolymers of poly(styrene butylacrylate acrylic acid), poly(styrene butadiene acrylic acid) or polymethacrylate polymethacrylic acid.

The resin or polymer in the latex selected for the process of the present invention is preferably prepared by batch emulsion polymerization methods, and the monomers utilized in such processes include styrene, acrylates, methacrylates, vinyl chloride, vinyl caprolate, vinyl acetate, vinylidene chloride, acrylonitrile, vinylpropionate, chloroprene, vinylxylene, vinyltoluene, and optionally acid or basic olefinic monomers, such as acrylic acid, methacrylic acid, itaconic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups is optional and such groups can be present in various amounts of from about 0.1 to about 10 percent by weight of the polymer resin. Known chain transfer agents, for example dodecanethiol, octanethiol, butanethiol, about 1 to about 10 percent, or carbon tetrabromide in effective amounts, such as from about 1 to about 10 percent, can also be selected when preparing the resin particles by emulsion polymerization. Other processes of obtaining resin particles of from, for example, about 0.01 micron to about 3 microns can be selected from polymer microsuspension process, such as disclosed in U.S. Pat. No.

3,674,736, the disclosure of which is totally incorporated herein by reference; polymer solution microsuspension process, such as disclosed in U.S. Pat. No. 5,290,654, the disclosure of which is totally incorporated herein by reference; mechanical grinding processes; or other known processes.

Various known conductive components present in an effective amount of, for example, from about 1 to about 45 percent by weight and preferably in an amount of from about 20 to about 40 weight percent can be selected, and which components enable conductive polymer coatings for carrier particles present including conductive carbon blacks available from Colombian Chemicals Company, such as CONDUCTEX 975™ or CONDUCTEX SC™, or Raven, Shawinigan Acetylene Black from Chevron, PRINTEX™ XE 2 from Degussa Corporation, KETJENBLACK™ EC-600 JD from AKZO Chemie America, Cabot Conductive Furnace Black XC 72 or Pearls 3700 from Cabot Corporation, or other conductive components such as metal oxides like tin oxide, zinc oxide, ytrium oxide, vanadium oxide, tungsten oxide, nickel oxide, cobalt oxide, cesium oxide, titanium oxide, mixtures thereof, and the like.

Examples of ionic surfactants include anionic and cationic with examples of anionic surfactants being, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from DKS International Inc., and the like. An effective concentration of the anionic surfactant generally employed is, for example, from about 0.01 to about 10 percent by weight, and preferably from about 0.1 to about 5 percent by weight of monomers used to prepare the copolymer resin particles of the emulsion or latex blend.

Examples of the cationic surfactants, which are usually positively charged, selected for the processes of the present invention include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from KAO Chemicals, and the like, and mixtures thereof. This surfactant is utilized in various effective amounts, such as for example from about 0.1 percent to about 5 percent by weight of water. Preferably, the molar ratio of the cationic surfactant used for flocculation to the anionic surfactant used in the latex preparation is in the range of from about 0.5 to 4, and preferably from 0.5 to 2.

Counterionic (latex is anionic and added surfactant is cationic) surfactants are comprised of either anionic or cationic surfactants as illustrated herein and in the amount indicated, thus, when the ionic surfactant is an anionic surfactant, the counterionic surfactant is a cationic surfactant.

Examples of colloidal stabilizers, which are added to the aggregated particles to prevent their growth in the coalescence step (heating above the resin Tg) can be selected from the anionic surfactants, such as sodium dodecylbenzene sulfonate, sodium dodecyinaphthalene sulfate, dialkyl benzenealkyl, sulfates and sulfonates, abitic acid, available from Aldrich, NEOGEN R™, NEOGEN SC™ obtained from DKS International Inc., and the like. They can also be selected from nonionic surfactants such as polyvinyl alcohol, polyacrylic acid, METHALOSE™ European Trademark for methylcellulose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Colloidal stabilizers also include particulated stabilizers such as a silica, titania, tricalcium phosphate, and the like. An effective concentration of the colloidal stabilizer is, for example, from about 0.01 to about 10 percent by weight, and preferably from about 0.5 to about 5 percent by weight of the total weight of the aggregates comprised of resin latex, pigment particles, water, ionic and nonionic surfactants mixture.

Specific embodiments of the present invention include preparing the pigment dispersion using microfluidizer at 10,000 psi, and wherein the pigment was well dispersed after 4 passes. Also, the latex and pigment dispersions were homogenized at 10,000 rpm using a continuous stirring device SD 41 for 8 minutes. The homogeneous blend was then aggregated for 2 hours at 70° C. while stirring at 400 rpm, and polymer aggregates of 5.3 microns with a GSD of 1.22 were obtained. To the aggregated mixture 60 milliliters of 20 percent solution of NEOGEN R™ were added and stirred for 5 minutes; the pH of the solution was then adjusted to 9 by the addition of 1M of sodium hydroxide, and the solution was than heated to 120° C. while stirring at 250 rpm, wherein the aggregates fall apart to form carrier size aggregates of less than 1 micron in size, which after heating for about 3 hours at the temperature above the resin Tg form the composite particles of carrier coating with conductivity of $10^{-7} \omega^{-1}$ $cm^{-1}$ comprised of conductive material and polymer.

Developer compositions can be prepared by mixing the carriers obtained with the processes of the present invention with known toner particles, reference U.S. Pat. Nos. 4,937,166 and 4,935,326, the disclosures of which are totally incorporated herein by reference, for example from about 2 percent toner concentration to about 8 percent toner concentration. The toners can be prepared by known mixing, grinding, attrition, and classification methods, or by emulsion aggregation methods as illustrated herein in the copending applications mentioned. The toner particles can be of an average size diameter of from about 1 to about 15, and preferably from about 3 to about 10 microns in average volume diameter.

Imaging methods are also envisioned with the developers of the present invention, reference for example a number of the patents mentioned herein, and U.S. Pat. No. 4,265,660, the disclosure of which is totally incorporated herein by reference.

The following Examples are being submitted to further define various species of the present invention. These Examples are intended to be illustrative only and are not intended to limit the scope of the present invention. Also, parts and percentages are by weight unless otherwise indicated.

EXAMPLE I

Polymeric Latex: was prepared by the emulsion polymerization of methylmethacrylate in nonionic/anionic surfactant solution (1.5 percent each) as follows: 400 grams of methylmethacrylate and 4 grams of dodecanethiol were mixed with 600 milliliters of deionized water in which 10 grams of sodium dodecyl benzene sulfonate anionic surfactant (NEOGEN R™ which contains 60 percent of active component), 8.6 grams of polyoxyethylene nonyl phenyl ether—nonionic surfactant (ANTAROX 897™—70 percent active), and 4 grams of ammonium persulfate initiator were dissolved. The emulsion was then polymerized at 80° C. for 8 hours. The resulting latex contained 40 percent solids of polymethylmethacrylate; the Tg of the latex dry sample was 86.8° C., as measured on a DuPont DSC; $M_w=70,000$, and $M_n=27,000$ as determined on a Hewlett Packard GPC. The particle size of the latex as measured on a Brookhaven Disc Centrifuge was 173 nanometers.

Pigment Dispersion: 26 grams of conductive carbon black CONDUCTEX SC™ with a particle size diameter of 20 nanometers and 1.4 grams of cationic surfactant SANIZOL B-50™ were dispersed in 200 grams of water using a microfluidizer operating at 10,000 rpm.

Preparation of the Aggregated Particles: 227.4 grams of the conductive carbon black pigment dispersion were added to 300 milliliters of water containing 1.5 grams of cationic surfactant alkylbenzyldimethyl ammonium chloride (SANIZOL B-50™). This was then simultaneously added with 325 grams of latex into a SD 41 continuous stirring device (Janke & Kunkel IKA Labortechnik) containing 300 grams of water. The pigment dispersion and the latex were well mixed by the continuous pumping thereof through the shearing chamber operating at 10,000 rpm for 8 minutes. A homogeneous blend was obtained which was then transferred into a kettle placed in a heating mantle, and equipped with mechanical stirrer and temperature probe. The temperature of the kettle was then raised from room temperature to 70° C. where the aggregation was performed for 2 hours, while stirring at 400 rpm. Aggregates of a polymethylmethacrylate latex and conductive carbon black with a particle size of 5.3 and with a GSD of 1.22 (as measured on the Coulter Counter) were obtained.

PREPARATION OF CONDUCTIVE SUBMICRON SIZE PARTICLES

The above prepared dispersion containing 12 percent (by weight) of aggregates of polymethylmethacrylate latex and conductive carbon black in water was stirred, while anionic surfactant—NEOGEN R™, 60 milliliters of 20 percent solution (by weight) were added, followed by stirring for 5 minutes. This was followed by the addition of 1M of sodium hydroxide solution and the pH was adjusted to pH=9, as measured on a Horiba pH-meter.

The above prepared basic dispersion of aggregates was then heated up from 70° to 120° C. at 1° C./minute, while stirring at 250 rpm. Aggregates of 5.3 microns started to fall apart and form smaller aggregates (800 nanometers in size) comprised of polymethylmethacrylate and conductive carbon black, which coalesced after being subjected to heating at 120° C. for 3 hours. After the aforementioned heating, spherical carrier polymer coating particles comprised of polymethylmethacrylate (80 percent) and conductive carbon black (20 percent by weight) were obtained of 800 nanometers in average volume diameter observed under a microscope and measured on a disc centrifuge.

The resulting conductive carrier coating particles comprised of polymethylmethacrylate (80 percent) and conductive carbon black (20 percent by weight) were then washed 5 times by centrifugation using deionized water (2 liters for each wash) and the particles were then dried on a freeze dryer. The yield of dry particles was 96 percent. The conductivity of the polymer product particles was $10^{-7}\omega^{-1}cm^{-1}$.

EXAMPLE II

Polymeric Latex: was prepared by the emulsion polymerization of methylmethacrylate/acrylic acid (90/10 (parts)) in nonionic/anionic surfactant solution (1.5 percent each) as follows: 360 grams of methylmethacrylate, 40 grams of acrylic acid, and 4 grams of dodecanethiol were mixed with 600 milliliters of deionized water in which 10 grams of sodium dodecyl benzene sulfonate anionic surfactant (NEOGEN R™ which contains 60 percent of active component), 8.6 grams of polyoxyethylene nonyl phenyl ether—nonionic surfactant (ANTAROX 897™—70 percent active), and 4 grams of ammonium persulfate initiator were dissolved. The emulsion was then polymerized at 80° C. for 8 hours. The resulting latex contained 40 percent solids; the Tg of the latex dry sample was 92.7° C., as measured on a DuPont DSC; $M_w=60,000$, and $M_n=24,000$, as determined on a Hewlett Packard GPC. The particle size of the latex as measured on a Brookhaven Disc Centrifuge was 184 nanometers.

Pigment Dispersion: 26 grams of conductive carbon black CONDUCTEX SC™ obtained from Columbian Chemicals with a particle size diameter of 20 nanometers and 1.4 grams of cationic surfactant SANIZOL B-50™ was dispersed in 200 grams of water at 10,000 rpm using a microfluidizer.

Preparation of the Aggregated Particles: 227.4 grams of the above conductive carbon black dispersion were added to 300 milliliters of water containing 1.5 grams of cationic surfactant alkylbenzyldimethyl ammonium chloride (SANIZOL B-50™). This was then simultaneously added with 325 grams of the above latex into the SD 41 continuous stirring device (Janke & Kunkel IKA Labortechnik) containing 300 grams of water. The pigment dispersion and the latex were then thoroughly mixed by the continuous pumping thereof through the shearing chamber of the SD 41 continuous stirring device operating at 10,000 rpm for 8 minutes. A homogeneous blend was obtained which was then transferred into a kettle placed in a heating mantle and equipped with mechanical stirrer and temperature probe. The temperature of the kettle was then raised from room temperature to 70° C. where the aggregation was performed for 2 hours while stirring at 400 rpm. Aggregates of poly(methylmethacrylate-co-acrylic acid) with a particle size of 4.7 and with a GSD (geometric size distribution) of 1.20 (as measured on the Coulter Counter) were obtained.

PREPARATION OF CONDUCTIVE SUBMICRON SIZE PARTICLES

The above dispersion containing 12 percent (by weight) of the aggregated particles of the polymer and conductive carbon black was stirred, while anionic surfactant—NEOGEN R™, 60 milliliters of 20 percent solution were added and stirred for 5 minutes. This was followed by the addition of 1M of sodium hydroxide solution and the pH was adjusted to pH=9, as measured on the Horiba pH-meter. The above basic dispersion of aggregates was then heated up from 70° to 120° C. at 1° C./minute while stirring at 250 rpm. Aggregates of 4.7 microns started to fall apart and form smaller aggregates (800 nanometers in size) of latex and conductive carbon black, which thoroughly coalesced after being subjected to heating 120° C. for 4 hours. After heating, spherical particles of 800 nanometers comprised of polymethylmethacrylate and conductive carbon black were obtained as observed under microscope and measured on a disc centrifuge.

The resulting carrier coating spherical particles comprised of poly(methylmethacrylate-co-acrylic acid) (80 percent) and conductive carbon black (20 percent by weight) were then washed by centrifugation using deionized water and dried on the freeze dryer. The yield of dry particles was 95 percent and the conductivity of the particles was $10^{-7}\omega^{-1}\text{cm}^{-1}$.

EXAMPLE III

Polymeric Latex: was prepared by the emulsion polymerization of styrene/acrylic acid in nonionic/anionic surfactant solution (3 percent) as follows: 360 grams of methylmethacrylate, 40 grams of acrylic acid, and 4 grams of dodecanethiol were mixed with 600 milliliters of deionized water in which 10 grams of sodium dodecyl benzene sulfonate anionic surfactant (NEOGEN R™ which contains 60 percent of active component), 8.6 grams of polyoxyethylene nonyl phenyl ether—nonionic surfactant (ANTAROX 897™—70 percent active), and 4 grams of ammonium persulfate initiator were dissolved. The emulsion resulting was then polymerized at 80° C. for 8 hours. The resulting latex contained 40 percent solids; the Tg of the latex dry sample was 91.6° C., as measured on a DuPont DSC; $M_w=60,000$, and $M_n=24,000$ as determined on a Hewlett Packard GPC. The particle size of the latex, as measured on a Brookhaven Disc Centrifuge, was 167 nanometers in average volume diameter.

Pigment Dispersion: 26 grams of conductive carbon black CONDUCTEX SC™ with a particle size of 20 nanometers in diameter and 1.4 grams of cationic surfactant SANIZOL B-50™ were dispersed in 200 grams of water at 10,000 rpm using a microfluidizer.

Preparation of the Aggregated Particles: 227.4 grams of the conductive carbon black dispersion were added to 300 milliliters of water containing 1.5 grams of cationic surfactant alkylbenzyldimethyl ammonium chloride (SANIZOL B-50™) . This was then simultaneously added with 325 grams of latex into the SD 41 continuous stirring device (Janke & Kunkel IKA Labortechnik) containing 300 grams of water. The pigment dispersion and the latex were then thoroughly mixed by the continuous pumping thereof through the shearing chamber operating at 10,000 rpm for 8 minutes. A homogeneous blend was obtained which was then transferred into a kettle placed in a heating mantle, and equipped with mechanical stirrer and temperature probe. The temperature of the kettle was then raised from room temperature to 70° C. where the aggregation was performed for 2 hours, while stirring at 400 rpm. Aggregates with a particle diameter size of 5.1 microns and with a GSD of 1.21 (as measured on the Coulter Counter) were obtained.

PREPARATION OF CONDUCTIVE SUBMICRON SIZE PARTICLES

The above dispersion of the aggregated particles comprised of 12 percent (by weight) of poly(styrene-co-acrylic acid) was stirred, while anionic surfactant—NEOGEN R™, 60 milliliters of 20 percent solution was added and stirred for 5 minutes. This was followed by the addition of 1M of sodium hydroxide solution and the pH was adjusted to pH=9, as measured on the Horiba pH-meter. The above basic dispersion of aggregates was then heated up from 70° to 120° C. at 1° C./minute while stirring at 250 rpm, and the aggregates of 5.1 microns in average volume diameter started to fall apart and form smaller aggregates (750 nanometers in size) of polymeric latex and conductive carbon black, which completely coalesced after being subjected to heating 120° C. for 4 hours. After heating, spherical particles of 750 nanometers in diameter were obtained as observed under a microscope and measured on a disc centrifuge.

The resulting spherical particles comprised of polystyrene-co-acrylic acid (80 percent) and conductive carbon black (20 percent by weight) were then washed by centrifugation using deionized water and dried on the freeze dryer. The yield of dry particles was 97 percent. Conductivity of the coalesced particles was $10^{-7}\omega^{-1}\text{cm}^{-1}$.

Other modifications of the present invention may occur to those skilled in the art subsequent to a review of the present application and these modifications, including equivalents thereof, are intended to be included within the scope of the present invention.

What is claimed is:

1. A process for the preparation of polymer compositions which comprises mixing a conductive component with an anionic polymeric latex containing a polymer; adding a cationic surfactant, or flocculant whereby the aggregation of the latex particles and the conductive component particles results; subsequently adding colloidal stabilizer, followed by the addition of a base to obtain a pH of from about 7 to about 12; heating above about the polymer glass transition temperature thereby enabling the severage, or breakage of the formed aggregated particles; further heating above about the polymer glass transition temperature enabling the coalescence of the polymer and conductive component particles; and optionally washing and drying the resulting coalesced product.

2. A process in accordance with claim 1 wherein the pH is from about 7 to about 9, and there is formed a conductive polymer with a conductive component dispersed therein.

3. A process in accordance with claim 1 wherein the conductive component is carbon black.

4. A process in accordance with claim 1 wherein the conductive component is carbon black present in an amount of from about 12 to about 40 weight percent based on the weight of the polymer and conductive component.

5. A process in accordance with claim 1 wherein the conductivity of the coalesced polymer product is from about $10^{-6}$ to about $10^{-9} \text{ohm}^{-1}\text{cm}^{-1}$.

6. A process in accordance with claim 1 wherein shear is accomplished during and subsequent to adding said cationic surfactant; the aggregates are from about 5 to about 10 microns in volume average diameter; and wherein heating the formed aggregates above about the polymer glass temperature at a pH of from about 7 to about 12 causes the severage, or breakage of the aggregated particles to smaller size aggregates of from about 0.5 to about 1 micron in average volume diameter.

7. A process in accordance with claim 1 wherein the polymer with conductive component dispersed therein is of a size of from about 0.5 to about 1 micron in volume average diameter.

8. A process in accordance with claim 1 wherein the temperature of the aggregation is less than the polymer glass transition temperature (Tg), thereby controlling the speed at which particles submicron in size are collected, and wherein there are formed aggregates of from about 5 to about 10 microns.

9. A process in accordance with claim 1 wherein the temperature of the coalescence is above the polymer glass transition temperature thereby controlling the morphology of the polymer particles formed, and which particles are selected as carrier coatings.

10. A process in accordance with claim 1 wherein the time of heating at a temperature above the polymer Tg controls the morphology of the polymer particles formed, and which particles are selected as carrier coatings.

11. A process in accordance with claim 1 wherein spherical conductive polymer carrier coating particles result.

12. A process in accordance with claim 6 wherein the homogenization or shearing is accomplished by homogenizing at from about 1,000 revolutions per minute to about 10,000 revolutions per minute for a duration of from about 1 minute to about 120 minutes.

13. A process in accordance with claim 1 wherein the polymer is selected from the group consisting of poly (methyl-methacrylate), poly(styrene-butadiene), poly(para-methyl styrene-butadiene), poly(meta-methylstyrene-butadiene), poly(alpha-methylstyrene-butadiene), poly (methylmethacrylate-butadiene), poly(ethylmethacrylate-butadiene), poly(propylmethacrylate-butadiene), poly (butylmethacrylate-butadiene), poly(methylacrylate-butadiene), poly(ethylacrylate-butadiene), poly (propylacrylate-butadiene), poly(butylacrylate-butadiene), poly(styrene-isoprene), poly(para-methyl styrene-isoprene), poly(meta-methylstyrene-isoprene), poly(alpha-methylstyrene-isoprene), poly(methylmethacrylate-isoprene), poly(ethylmethacrylate-isoprene), poly (propylmethacrylate-isoprene), poly(butylmethacrylate-isoprene), poly(methylacrylate-isoprene), poly (ethylacrylate-isoprene), poly(propylacrylate-isoprene), and poly(butylacrylate-isoprene).

14. A process in accordance with claim 1 wherein the polymer is a copolymer of poly(methacrylic acid), poly (acrylic acid), poly(itaconic acid), poly(methyl-methacrylate), poly(styrene-butadiene), poly(para-methyl styrene-butadiene), poly(meta-methylstyrene-butadiene), poly(alpha-methylstyrene-butadiene), poly (methylmethacrylate-butadiene), poly(ethylmethacrylate-butadiene), poly(propylmethacrylate-butadiene), poly (butylmethacrylate-butadiene), poly(methylacrylate-butadiene), poly(ethylacrylate-butadiene), poly (propylacrylate-butadiene), poly(butylacrylate-butadiene), poly(styrene-isoprene), poly(para-methyl styrene-isoprene), poly(meta-methylstyrene-isoprene), poly(alpha-methylstyrene-isoprene), poly(methylmethacrylate-isoprene), poly(ethylmethacrylate-isoprene), poly (propylmethacrylate-isoprene), poly(butylmethacrylate-isoprene), poly(methylacrylate-isoprene), poly (ethylacrylate-isoprene), poly(propylacrylate-isoprene), or poly(butylacrylate-isoprene).

15. A process in accordance with claim 1 wherein the conductive component is selected from the group consisting of tin oxide, zinc oxide, ytrium oxide, vanadium oxide, tungsten oxide, nickel oxide, cobalt oxide, cesium oxide, titanium oxide, and mixtures thereof.

16. A process in accordance with claim 1 wherein the anionic polymeric latex contains an anionic surfactant selected from the group consisting of sodium dodecyl sulfate, sodium dodecylbenzene sulfate and sodium dodecylnaphthalene sulfate.

17. A process in accordance with claim 1 wherein the colloidal stabilizer is selected from the group consisting of anionic surfactants, nonionic surfactants, polyvinyl alcohol, methalose, methyl cellulose, ethyl cellulose, propyl cellulose, hydroxy ethyl cellulose, and carboxy methyl cellulose.

18. A process in accordance with claim 17 wherein the colloidal stabilizer is the anionic surfactant sodium dodecyl sulfate, sodium dodecylbenzene sulfate, or sodium dodecylnaphthalene sulfate; the nonionic surfactant is polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, or dialkylphenoxy poly(ethyleneoxy) ethanol.

19. A process in accordance with claim 1 wherein the polymer is from about 0.01 to about 3 microns in average volume diameter; and the conductive component particles are from about 0.01 to about 3 microns in volume average diameter.

20. A process in accordance with claim 1 wherein the product of polymer with conductive component is washed with warm water, and the surfactants are removed therefrom, followed by the drying thereof.

21. A process in accordance with claim 1 wherein said heating is from about 5° to about 50° C. above the polymer glass transition temperature, or wherein the polymer glass transition temperature, Tg, is from about 50° to about 100° C., or the polymer Tg is 54° C., and heating is from about 59° to about 104° C.

22. A process for the preparation of conductive polymer particles which comprises the synthesis, or provision of a submicron anionic polymer latex, and which latex is prepared by batch emulsion polymerization; dispersing a conductive component submicron in size in the polymer latex; adding a cationic surfactant, or flocculent with high shear whereby the aggregation of the latex particles and the conductive component results, enabling aggregates of from about 5 to about 10 microns in average volume diameter; adding a base component to obtain a pH of from about 8 to 12; heating the formed aggregates above about the polymer Tg, which heating causes the severage, or breakage of the aggregates to smaller aggregates of from about 0.5 to about 1 micron; further heating above about the polymer Tg to coalesce the polymer and conductive particles; followed by washing and drying.

23. A process in accordance with claim 22 wherein the base is sodium hydroxide.

24. A process for the preparation of polymer compositions comprising mixing a conductive component with an anionic polymeric latex prepared by emulsion polymerization utilizing anionic surfactants, or a mixture of anionic and nonionic surfactants; adding a cationic surfactant, or flocculant whereby the aggregation of the latex particles and the conductive particles results; adding colloidal stabilizer, followed by the addition of an alkali base to obtain a pH of from about 7 to about 12; heating the formed aggregates above the polymer glass transition temperature thereby enabling the severage, or breakage of the aggregated particles; heating further above the polymer glass transition temperature enabling the coalescence of the polymer and conductive component particles; and washing and drying the resulting coalesced product.

25. A process in accordance with claim 24 wherein the nonionic surfactant concentration used in the latex preparation is from about 0.1 to about 5 weight percent; the anionic surfactant concentration used in the latex preparation is from about 0.1 to about 5 weight percent; and the cationic surfactant concentration is from about 0.1 to about 5 weight percent.

* * * * *